United States Patent [19]

Soyck

[11] 4,236,149
[45] Nov. 25, 1980

[54] STATUS INDICATING SYSTEM FOR THE INSTANTANEOUS REGISTERING OF THE SWITCHING POSITIONS IN AN ELECTRICALLY REMOTELY CONTROLLED HIGH TENSION PLANT

[76] Inventor: Gerno Soyck, Höveler Weg 47, Halver, Fed. Rep. of Germany

[21] Appl. No.: 885,162

[22] Filed: Mar. 10, 1978

[30] Foreign Application Priority Data

Mar. 16, 1977 [DE] Fed. Rep. of Germany ....... 2711416

[51] Int. Cl.³ .............................................. G08B 21/00
[52] U.S. Cl. ................................................... 340/644
[58] Field of Search ........ 340/507, 511, 524, 638–639, 340/644, 645, 651–653

*Primary Examiner*—Thomas A. Robinson
*Attorney, Agent, or Firm*—Abraham A. Saffitz

[57] ABSTRACT

A status indicating system for the instantaneous registration of the open and closed states of the switches of a remotely supervised high tension plant comprising a multiplicity of substations each having a plurality of high tension switches which require monitoring and supervision, wherein each switch is provided with two pilot indicating contacts signalling the respective switch position of off and on, said pilot indicating contacts delivering signals to a remotely located central supervision station by means of a long distance transmission circuit where the signals are monitored. In the status indicating system every high tension switch is provided with two proximity switches registering its end positions. The proximity switches are damped by a vane which is moved by an operating shaft of the high tension switch. The two possible outputs of activated proximity switches are always different from zero and these outputs actuate pilot indicating contacts by means of pilot relays. The status of each high tension switch is characterized by the contrary positions of a pair of pilot indicating contacts belonging to said high tension switch and the positions of the pilot indicating contacts and the contrarity of said contact pair are supervised at the central supervising station.

5 Claims, 3 Drawing Figures

STATUS INDICATING SYSTEM FOR THE INSTANTANEOUS REGISTERING OF THE SWITCHING POSITIONS IN AN ELECTRICALLY REMOTELY CONTROLLED HIGH TENSION PLANT

CROSS REFERENCE TO RELATED APPLICATIONS

Reference is made to my West German Application, Ser. No. P 27 11 416.5, filed Mar. 16, 1977, under which priority under 35 USC 119 is claimed.

BACKGROUND OF THE INVENTION

A. Field of the Invention

This invention lies in the field of remote indicating and supervisory circuits and is concerned with a status indicating system for the instantaneous registration of the open or closed switch positions in a remotely controlled high tension plant. The high tension plant is provided with a large number of substations each having a group of high tension switches. Each high tension switch has two pilot indicating contacts for the respective switch positions. Pilot signals transmit information from the pilot indicating contacts to a central supervising station by a long distance transmission circuit to indicate, at the remotely located central supervising station, the positions of said two pilot indicating contacts, which positions are normally contrary. The supervisory circuit at said remote central supervising station also monitors contrary of the pilot signals.

B. The Prior Art

The prior art which is used in commerce is described in FIG. 1 herein.

Status indicating systems of the type mentioned for high tension plants are known in which the two pilot indicating contacts are part of an auxiliary switch, which is mechanically connected to a movable part of the high tension switch to be supervised in such a way that one pilot indicating contact is closed and at all times the other pilot indicating contact is open. In view of the large number of high tension switches at a substation, which switches require supervision and for which interlocking tasks and functions are to be carried out, a multiplicity of further contacts is necessary and connecting leads are to be laid from the multiple contacts to a control switchboard at the substation, which leads cause considerable and expensive wiring requirements in the conventional status indicating system. Even more disadvantageous in the conventional status indicating system of the high tension plant is the fact that the status indicating system is not completely supervised for possible internal faults since it cannot be immediately determined from the central supervising station when that part of the status indicating system is defective, which belongs to a supervised high tension switch, which is just in off-position. Finally, with the conventional status indicating system it cannot be determined from the central supervising station whether a detected fault is caused in a substation or along the long distance transmission circuit, which often causes difficulty in locating the fault.

OBJECTS OF THE INVENTION

The basic object of the invention is to eliminate the defects of the status indicating system described in the preceding paragraph so that parts of the status indicating system, even when in the off position, are continually monitored as to operational readiness and a source of fault can be more accurately localized at the central supervising station.

It is a further object of the invention to provide a status indicating system for the instantaneous registering of the switching position in an remotely controlled high tension plant in which all the open and closed states of the high tension switches are determined by electronic means and not by electromechanical means.

Other objects of the invention will in part be obvious and will in part appear hereafter.

The invention accordingly comprises the features of construction, combination of elements, and arrangement of parts exemplified in the construction hereinafter set forth, and the scope of the invention is indicated in the claims.

SUMMARY OF THE INVENTION

In order to solve the aforesaid problems, the invention provides the improvement comprising:

(a) a multiplicity of proximity switches each delivering as normal values in the actuated state an output signal which is different from zero and in the non-actuated state another output signal, which is also different from zero;

(b) two by two of said proximity switches being associated with each supervised high tension switch and being located at a respective substation of said multiplicity of substations;

(c) each of said switch shafts of said high tension switches being provided with a vane which actuates in the off-position of its high tension switch one of the two associated proximity switches and in the on-position of the high tension switch the other one of said proximity switches;

(d) a multiplicity of pilot relays each controlled by the output of one of said proximity switches and each having one of said pilot indicating contacts;

(e) a multiplicity of first fault indicator circuits;

(f) said multiplicity of pilot relays being provided with change over contacts, the change over contacts of two pilot relays belonging to the two proximity switches of one of said high tension switches lying in one of said first fault indicator circuits to each deliver first fault signals when the output signals of said two proximity switches associated with one of said high tension switches are not different from another;

(g) a multiplicity of second fault indicator circuits (h) the output signals of said two proximity switches associated with one of said high tensions switches being delivered to one of said second fault indicator circuits monitoring that at all times one of the two normal output signals of each proximity switch is present and delivering otherwise second fault signals; and (i) a further fault indicator means at the central supervising station indicating when one of said first or said second fault signals is transmitted from the substation to the central supervising station.

A number of advantages are achieved by the invention. In the first place, the mechanical auxiliary switches that have been previously used and the adjustment and wear problems resulting from the mechanical coupling are eliminated through the use of the electronic proximity switches which, preferably, are inductive switches with non-contact activation. In the second place, only the output leads of the proximity switches of a substation now need be connected to the control cabinet located at the substation whereas the pilot indicating contacts and the multiplicity of the further contacts required for interlocking task and functions may be located in the control cabinet to thereby reduce to a considerable extent the amount of wiring required. Furthermore, in the status indicating system of the invention, all parts are continually monitored for operational readiness and it is possible for the personnel at the central supervising station to locate the source of a fault more accurately, when a fault is indicated, and especially to distinguish between local faults at a substation and remote faults on the transmission circuit. Taken as a whole, the invention provides a status indicating system which simplifies the construction and operation of remotely controlled high tension plant significantly and considerably increased its functional reliability.

In putting the invention into effect an individual fault indicator means is provided at the central supervision station for each high tension switch to be supervised. But it is often enough if only one collective fault indicator means is provided at the central supervising station for all high tension switches of one substation.

BRIEF DESCRIPTION OF THE DRAWING

For a fuller understanding of the nature and objects of the invention, reference should be had to the following detailed description taken in connection with the accompanying drawing, which is a schematic representation of a status indicating system embodying the invention.

PRIOR ART OF FIG. 1

Figure 1:
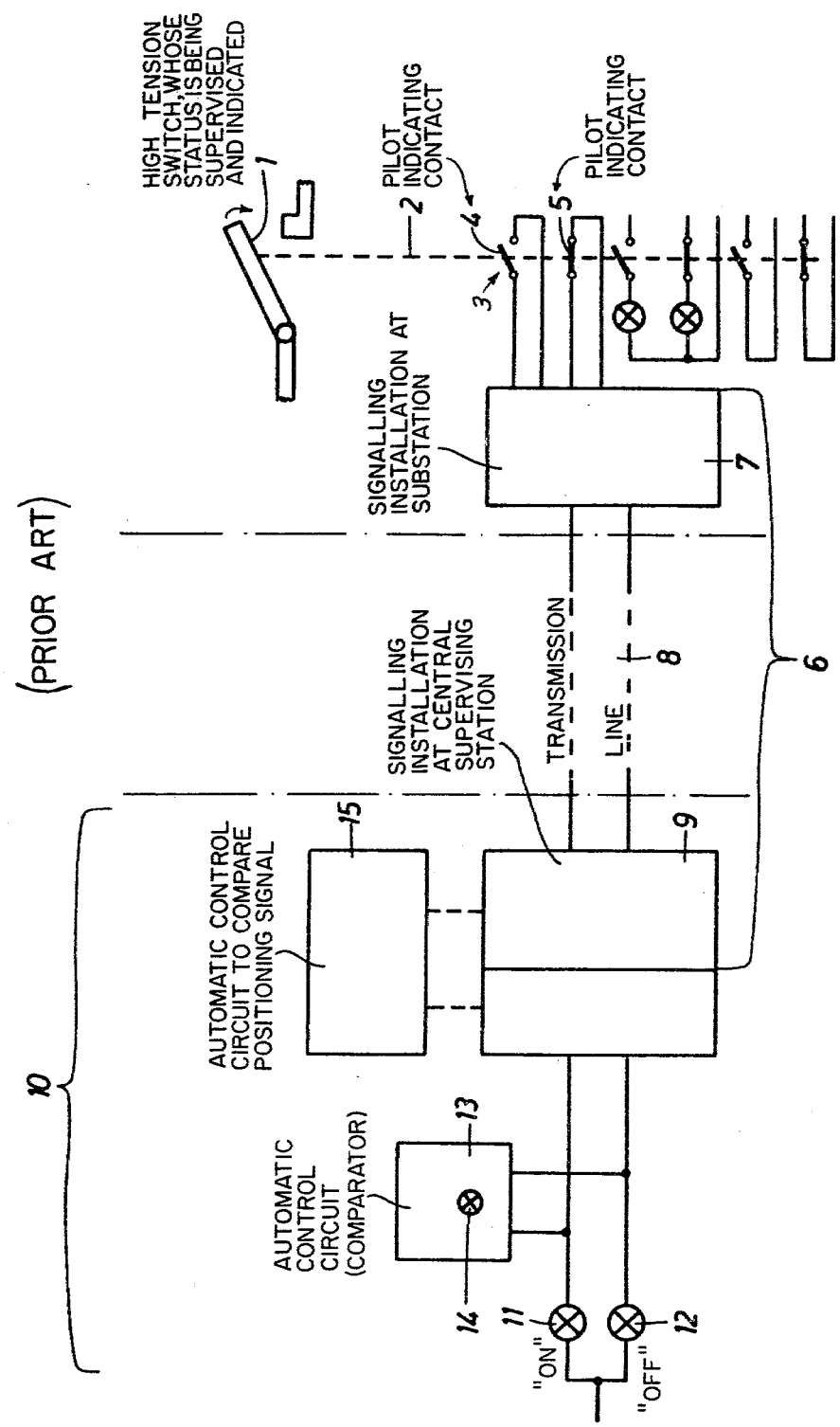
FIG. 1 shows a schematic wiring diagram of a conventional status indicating system of the prior art for instantaneous registration of the open or closed switch positions of a remotely controlled high tension plant.

A high tension switch 1 to be supervised is diagrammatically shown in FIG. 1. The high tension switch 1 is connected with an auxiliary switch 3 by a mechanical coupling 2 in the conventional status indicating system of the prior art, which auxiliary switch has pilot indicating contacts 4,5. When the high tension switch is open (off-position) then the pilot indicating contact 4 through the mechanical coupling 2 is also opened and the pilot indicating contact 5 closed. From both pilot indicating contacts 4, 5 can be obtained a pilot signal which is representative for the off-position of the high tension switch, but the pilot signals of the pilot indicating contacts 4, 5 are different from each other and can be expressed in digital terminology as a signal pair "0,1" consisting of the complementary or antivalent signals "0" and "1". When the high tension switch 1 is closed (on-position) then the pilot indicating contacts 4,5 deliver the contrary signal pair "1,0". The signal states of the two pilot indicating contacts 4, 5 are delivered to a central supervising station 10 through a long distance transmission circuit 6 consisting of a local installation 7 at the substation, the transmission line 8 and the remote installation 9 at the central supervising station 10. An indicator 11 in the central supervising station 10 indicates the high tension switch position "ON" and an indicator 12 indicates the high tension switch position "OFF". By means of a comparator circuit 13, the two arriving signals corresponding to the pair of pilot signals of the pilot indicating contacts 4, 5 are monitored. If the signals of contacts 4 and 5 are different from one another this is the normal condition. If the signals are the same then the condition is not normal and the abnormal condition is indicated by the lighting of a lamp 14 or some other indicating device.

Since a large number of high tension switches are supervised in a high tension plant and the signals are delivered from the local substation to the central supervising station by means of a common long distance transmission circuit 6, there is a need for an automatic control device 15 in the central supervision station 10 to compare the positioning signals for the high tension switch which are issued from the central supervising station with the signals coming from the high tension switch at the substation in order to show the actual switch position.

However, with the known status indicating system in FIG. 1. that has been described above all possible faults cannot be immediately recognized at the central supervising station 10, e.g. a break in the mechanical coupling 2 or a defect in the pilot indicating contact 4, which is only in a readiness position. In addition, when there is an indication of a fault at 14 one cannot decide from the central supervising station whether the defect is in the local circuitry at a substation or in the long distance transmission circuit 6.

DESCRIPTION OF THE PREFERRED EMBODIMENTS

Figure 2:
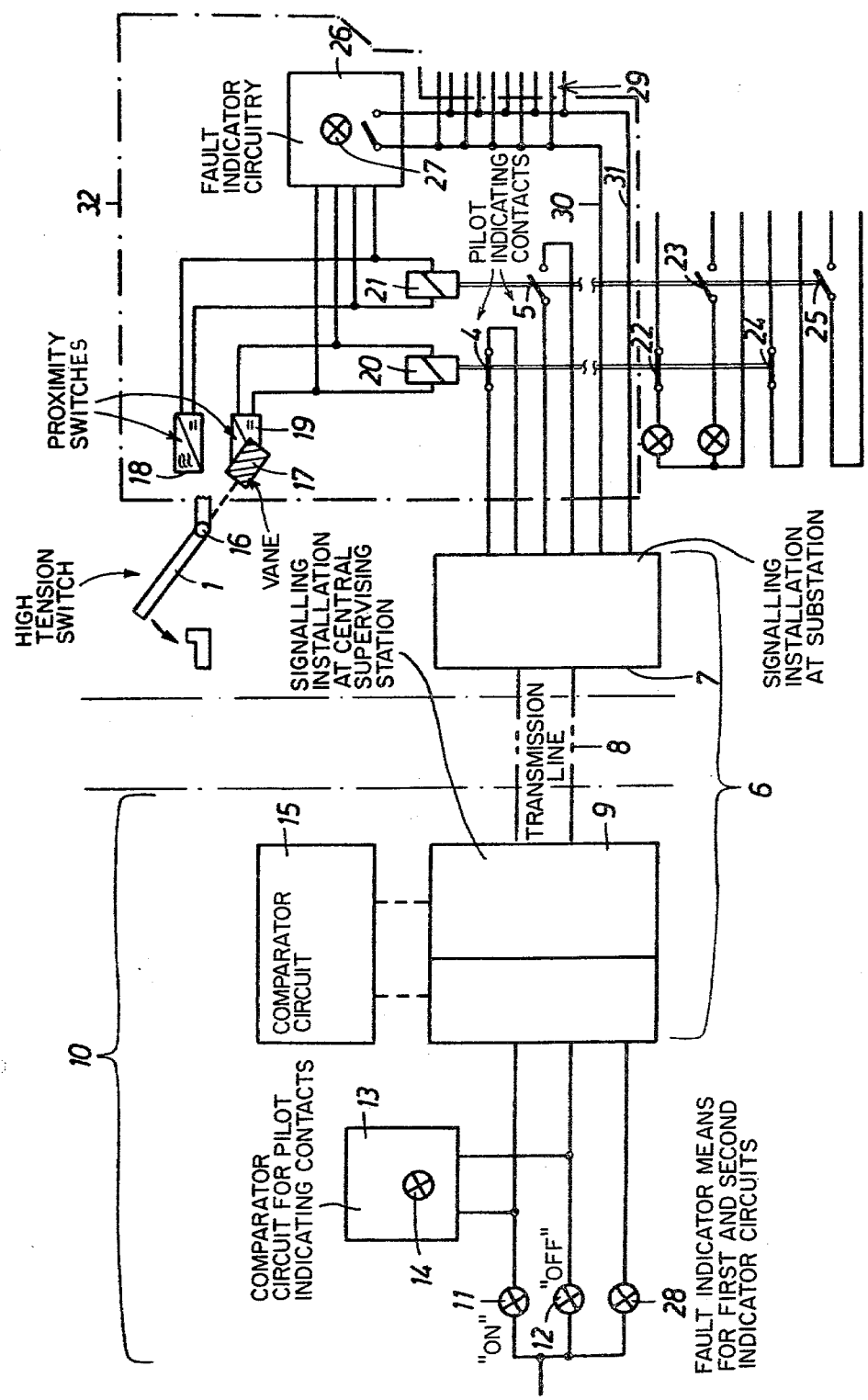
FIG. 2 shows a schematic wiring diagram of a status indicating system according to the invention.

FIG. 2 shows a schematic wiring diagram of the status indicating system of the invention with the central supervising station 10, the parts 11, 12, 13, 14 and 15 at the central supervising station, the long distance transmission circuit 6, a high tension switch 1 to be supervised and the alternately closed or opened pilot indicating contacts 4, 5.

A vane 17 is connected with the switch shaft 16 of the high tension switch 1 which dampens one of the proximity switches 18, 19 depending on the position of the high tension switch. The switches 18, 19 are preferably inductive proximity switches which deliver operational outputs differing from zero in the dampened and in the undampened state, for example, outputs of 2 and 6 milliamperes respectively and 15 and 20 volts respectively.

Figure 3:
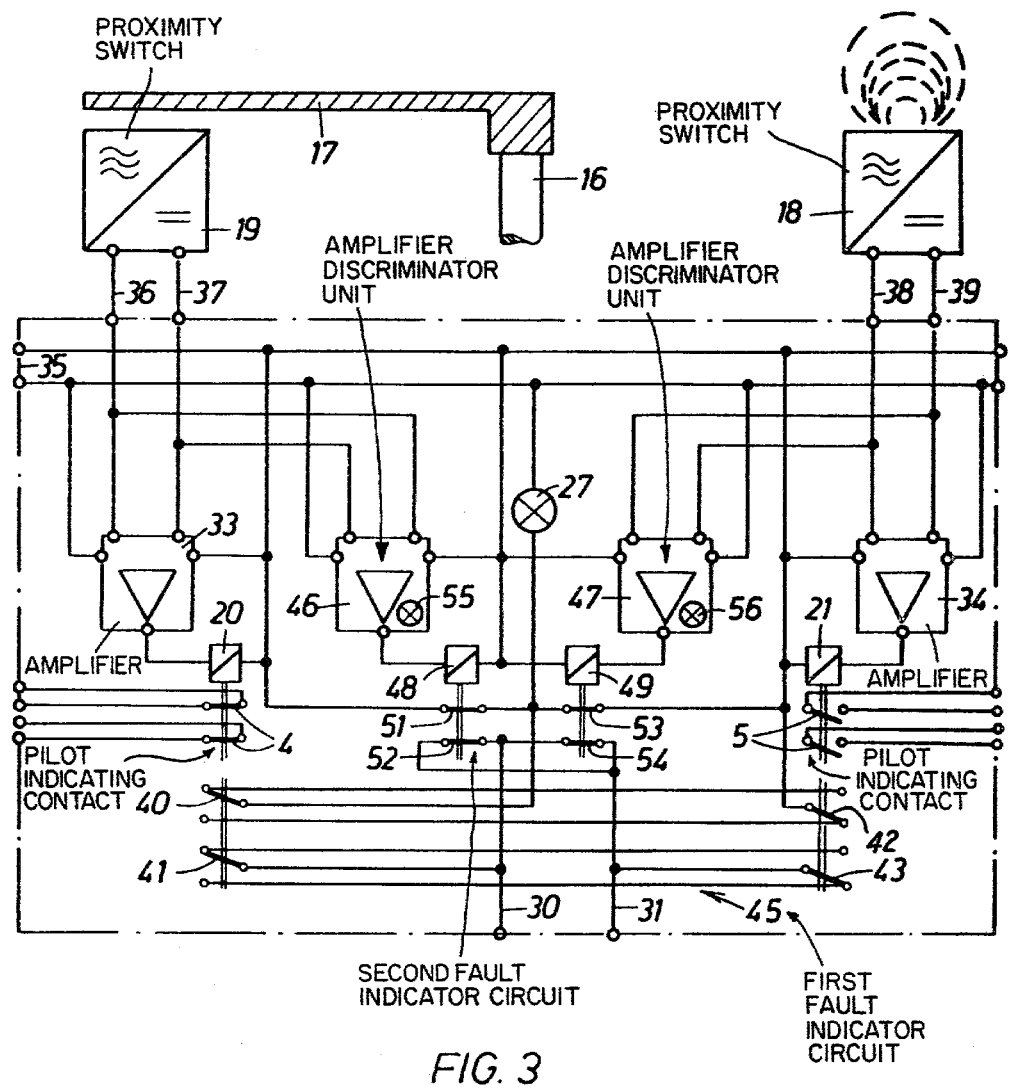
FIG. 3 shows, in detail, the part of the status indicating system included within the dash-dot line 32 of FIG. 2.

As shown in FIG. 3, the output of each of the proximity switches 18, 19 is connected indirectly, that is, through the amplifiers 33, 34 to one of the pilot relays 20, 21 which relays 20 and 21 have the pilot indicating contacts 4 and 5 respectively and further, the contacts 22, 23, 24, 25 for closing the circuit in the module to local signal indicators or to interlocking devices.

The outputs of the two proximity switches 18, 19 are connected to fault indicator circuitry 26 which carries out a special supervisory task that is described in greater detail hereinafter. In case of a fault, indicator circuitry 26 delivers a fault signal to a fault indicator 27 that is provided locally and through the long distance transmission circuit 6 to a fault indicator means 28 which is provided in the central supervising station 10. The output lines 29 of fault indicator circuits of the high tension switches which are adjacent are attached to the output lines 30, 31 of the fault indicator circuitry 26 so to form summed or added fault signals to thereby provide the collective fault indicator means 28 which is located in the central supervising station 10 in the embodiment shown in FIGS. 2 and 3.

As can be seen from FIG. 3 there is further shown the connection of the two-wire proximity switches 18, 19 to a power source 35 each through an amplifier unit 33, 34. The outputs of the proximity switches 18, 19 are connected by the output lines 36, 37 and 38, 39 respectively to the effective inputs of the amplifier units 33, 34.

When either proximity switch 18, 19 is dampened, for example the proximity switch 19, the amplifiers 33, 34 deliver an output that is required to energize their respective pilot relays 20 and 21 which are connected behind them since the operational output of a non-dampened proximity switch is not sufficient for the initial activation of the amplifiers 33, 34.

Each of the pilot relays 20, 21, furthermore, have two changeover switch contacts 40, 41 and 42, 43 respectively. The changeover switch contacts 40 and 42 together with the indicator 27 and the source of voltage 35, form a local fault indicator circuit, while the changeover switch contacts 41 and 43, together with an auxiliary source of voltage, not shown, form another fault indicator circuit 45, the output of which is carried to the fault indicator means 28 in the remote central supervising station 10 over the output leads 30, 31 of the fault indicator circuitry 26. The amplifiers 33, 34 and the changeover switch contacts 41, 43 of the pilot relays 20, 21 form a first fault indicator circuit which delivers a fault signal over the leads 30, 31 to the fault indicator means 28 at the central supervising station 10.

The status indicating system that has so far been described still does not suffice for the immediate recognition of all of the internal faults of the proximity switches and the line defects which may occur, such as short circuits and interruptions. The special fault indicator circuitry 26 is provided for this purpose and comprises two amplifier and discriminator units 46, 47 which deliver an output signal to energize the fault relays 48, 49 to hold closed the auxiliary contacts 50, 51 52, 53 when the one or the other normal operational outputs of both proximity switches is present. The normally closed auxiliary contacts 51, 53 which are open in undisturbed operation are located in a circuit containing the local indicator 27, while the normally closed auxiliary contacts 52, 54 are connected in parallel to each other between the output leads 30, 31 for remote indication. The amplifier and discriminator units 46, 47, the fault relays 48, 49 and the auxiliary contacts 52, 54 form a second fault indicator circuit, which delivers a fault signal to the fault indicator means 28 at the central supervising station. If one of the two proximity switches does not deliver one or the other of its normal operational outputs then the fault relays 48, 49 are de-energized and the fault is immediately indicated. The fault relays 48, 49 the amplifier and discriminator units 46, 47 and their connecting leads are also monitored for continuous operational readiness by the use of the normally closed auxiliary contacts. The other indicator lamps 55, 56 of the amplifier and discriminator units 46, 47 immediately indicate the side where the defect is located.

In the status indicating system that has been described the operator at the central supervising station 10 immediately receives the following information by means of the two indicator lamps 14, 28:

I When both lamps 14, 28 are out: undisturbed operation;

II When both lamps 14, 28 are on: the fault is located in the local circuitry, with a fault on the side of the proximity switch that is not dampened and is in the readiness position also being indicated;

III When lamp 14 is on and lamp 28 is out: there is a fault in the long distance transmission circuit 6;

IV When lamp 14 is out and lamp 28 is on: there is a fault in the local circuitry, and it is on the side of the proximity switch that is not dampened and is in the readiness position, for example, fault caused by a short circuit in the proximity switch supply line.

The invention is not limited to the embodiment that is shown in the diagram. Three-wire or four-wire proximity switches may be used.

Having described the invention, what is claimed as new and secured by Letters Patent is:

1. In a status indicating system for high tension switches of a remotely supervised high tension plant comprising a multiplicity of substations each having a plurality of high tension switches each fitted with a movable switch shaft, each of said high tension switches being provided with two pilot indicating contacts signalling the respective switch position of off and on by a pair of two normally different and complementary pilot signals for each switch position, the pairs of pilot signals being delivered to a remotely located central supervising station which is fitted with indicating means for indicating the positions of off and on of the high tension switches and with a comparator circuit with indicating output to show when the pilot signals of a pair are not different from another, that improvement comprising;
  (a) a multiplicity of proximity switches each delivering as normal values in the actuated state an output signal which is different from zero and in the non-actuated state another output signal, which is also different from zero;
  (b) two by two of said proximity switches being associated with each supervised high tension switch and being located at a respective substation of said multiplicity of substations;
  (c) each of said switch shafts of said high tension switches being provided with a vane which actuates in the off-position of its high tension switch one of the two associated proximity switches and in the on-position of the high tension switch the other one of said proximity switches;
  (d) a multiplicity of pilot relays each controlled by the output of one of said proximity switches and each having one of said pilot indicating contacts;
  (e) a multiplicity of first fault indicator circuits;
  (f) said multiplicity of pilot relays being provided with change over contacts, the change over contacts of two pilot relays belonging to the two proximity switches of one of said high tension switches being disposed in one of said first fault indicator circuits to each deliver first fault signals when the output signals of said two proximity switches associated with one of said high tension switches are not different from another;
  (g) a multiplicity of second fault indicator circuits
  (h) the output signals of said two proximity switches associated with one of said high tensions switches being delivered to one of said second fault indicator circuits monitoring that at all times one of the two normal output signals of each proximity switch is present and delivering otherwise second fault signals; and
  (i) a further fault indicator means at the central supervising station indicating when one of said first or said second fault signals is transmitted from the substation to the central supervising station.

2. A status indicating system as claimed in claim 1 wherein an individual separate fault indicator means is provided at the central supervising station for each high tension switch that is to be supervised.

3. A status indicating system as claimed in claim 1 wherein at the central supervising station there are provided a multiplicity of fault indicator means each common for a group of high tension switches, e.g. for all high tension switches of one substation.

4. A status indicating system as claimed in claim 1 wherein a further fault indicator is provided in each of said second fault indicator circuits at the substation.

5. A status indicating system as claimed in claim 1 wherein there are provided discriminators at the substation which receive the output signals of the proximity switches and which monitor the output signals for having one of its two normal values and initiating otherwise the second fault signal.

* * * * *